US012679728B2

(12) United States Patent
Chow et al.

(10) Patent No.:   US 12,679,728 B2
(45) Date of Patent:       Jul. 14, 2026

(54) REACTOR SYSTEM AND METHOD THEREOF FOR DEGASSING SULFUR

(71) Applicant: Fluor Technologies Corporation, Irving, TX (US)

(72) Inventors: Thomas K.T. Chow, Villa Park, CA (US); Stephen N. Fenderson, Gladewater, TX (US); Marcus Weber, Mission Viejo, CA (US); Trang A. Ngo, Rancho Mission Viejo, CA (US); Denny W. Li, Fountain Valley, CA (US); Theresa Flood, Mission Viejo, CA (US)

(73) Assignee: Fluor Technologies Corporation, Irving, TX (US)

( * ) Notice: Subject to any disclaimer, the term of this patent is extended or adjusted under 35 U.S.C. 154(b) by 586 days.

(21) Appl. No.: 17/848,340

(22) Filed: Jun. 23, 2022

(65)          Prior Publication Data
        US 2023/0416087 A1      Dec. 28, 2023

(51) Int. Cl.
     *C01B 17/02*          (2006.01)
     *B01D 19/00*          (2006.01)
                (Continued)

(52) U.S. Cl.
     CPC ...... *C01B 17/0232* (2013.01); *B01D 19/0005* (2013.01); *B01D 53/8612* (2013.01);
                (Continued)

(58) Field of Classification Search
     CPC ............ C01B 17/0232; B01D 19/0005; B01D 53/8612; B01J 21/04; B01J 21/063;
                (Continued)

(56)          References Cited

U.S. PATENT DOCUMENTS

| 5,632,967 A | 5/1997 | Nasato |
| 8,663,596 B2 * | 3/2014 | Garg ................... C01B 17/0232 |
| | | 423/578.1 |

(Continued)

FOREIGN PATENT DOCUMENTS

| EP | 2347995 A1 | 7/2011 |
| WO | WO9506616 A1 | 3/1995 |

(Continued)

OTHER PUBLICATIONS

Chow, Thomas K.T., et al., "Reactor System and Method Thereof for Degassing Sulfur," filed Oct. 26, 2023, U.S. Appl. No. 63/593,470.

(Continued)

*Primary Examiner* — Daniel C. Mccracken
*Assistant Examiner* — Logan Laclair
(74) *Attorney, Agent, or Firm* — Andrew M. Metrailer; Thaddeus J. Faleski; Conley Rose, P.C.

(57)          ABSTRACT

A reactor system can include a reactor, including: a first inlet for a first stream including a liquid sulfur including a dissolved hydrogen sulfide, a polysulfide, or a combination thereof. A second inlet can be for a second stream, wherein the second stream can be an oxygen-containing gas with no more than about 2%, by weight nitrogen. A packing can be in contact with a catalyst.

6 Claims, 1 Drawing Sheet

(51) Int. Cl.

| | |
|---|---|
| *B01D 53/86* | (2006.01) |
| *B01J 21/04* | (2006.01) |
| *B01J 21/06* | (2006.01) |
| *B01J 21/08* | (2006.01) |
| *B01J 21/12* | (2006.01) |
| *B01J 23/04* | (2006.01) |
| *B01J 23/745* | (2006.01) |
| *B01J 35/56* | (2024.01) |

(52) U.S. Cl.
CPC ............. *B01J 21/04* (2013.01); *B01J 21/063* (2013.01); *B01J 21/08* (2013.01); *B01J 21/12* (2013.01); *B01J 23/04* (2013.01); *B01J 23/745* (2013.01); *B01J 35/56* (2024.01)

(58) Field of Classification Search
CPC ... B01J 21/08; B01J 21/12; B01J 23/04; B01J 23/745; B01J 35/56
See application file for complete search history.

(56) References Cited

U.S. PATENT DOCUMENTS

| | | | |
|---|---|---|---|
| 11,097,952 B2 | 8/2021 | Chow et al. | |
| 2011/0182802 A1 | 7/2011 | Garg | |
| 2012/0308456 A1 | 12/2012 | Leta | |
| 2020/0290874 A1 | 9/2020 | Fenderson et al. | |
| 2020/0385274 A1* | 12/2020 | Chow ................... | B01D 53/18 |

FOREIGN PATENT DOCUMENTS

| | | |
|---|---|---|
| WO | 2013002791 A1 | 1/2013 |
| WO | WO2023249642 | 12/2023 |

OTHER PUBLICATIONS

Chow, Thomas K.T., et al. "Reactor System and Method Thereof for Degassing Sulfur," filed Jun. 24, 2022, Application No. PCT/US2022/034985.

Partial Search Report date Mar. 21, 2023, Application No. Application No. PCT/US2022/034985 filed on Jun. 24, 2022.

International Search Report and Written Opinion date May 12, 2023, Application No. Application No. PCT/US2022/034985 filed on Jun. 24, 2022.

Chow, Thomas K.T., et al., "Reactor System and Method Thereof for Degassing Sulfur," filed Oct. 23, 2023, U.S. Appl. No. 63/593,470.

International Preliminary Report on Patentability date Jan. 2, 2025, Application No. Application No. PCT/US2022/034985 filed on Jun. 24, 2022.

Partial Search Report date Nov. 21, 2024, Application No. PCT/US2024/052801 filed on Oct. 24, 2024.

International Search Report and Written Opinion date Nov. 21, 2024, Application No. PCT/US2024/052801 filed on Oct. 24, 2024.

Chow, Thomas K.T., et al., "Reactor System and Method Thereof for Degassing Sulfur," filed Oct. 24, 2024, PCT Application No. PCT/US2024/052801.

* cited by examiner

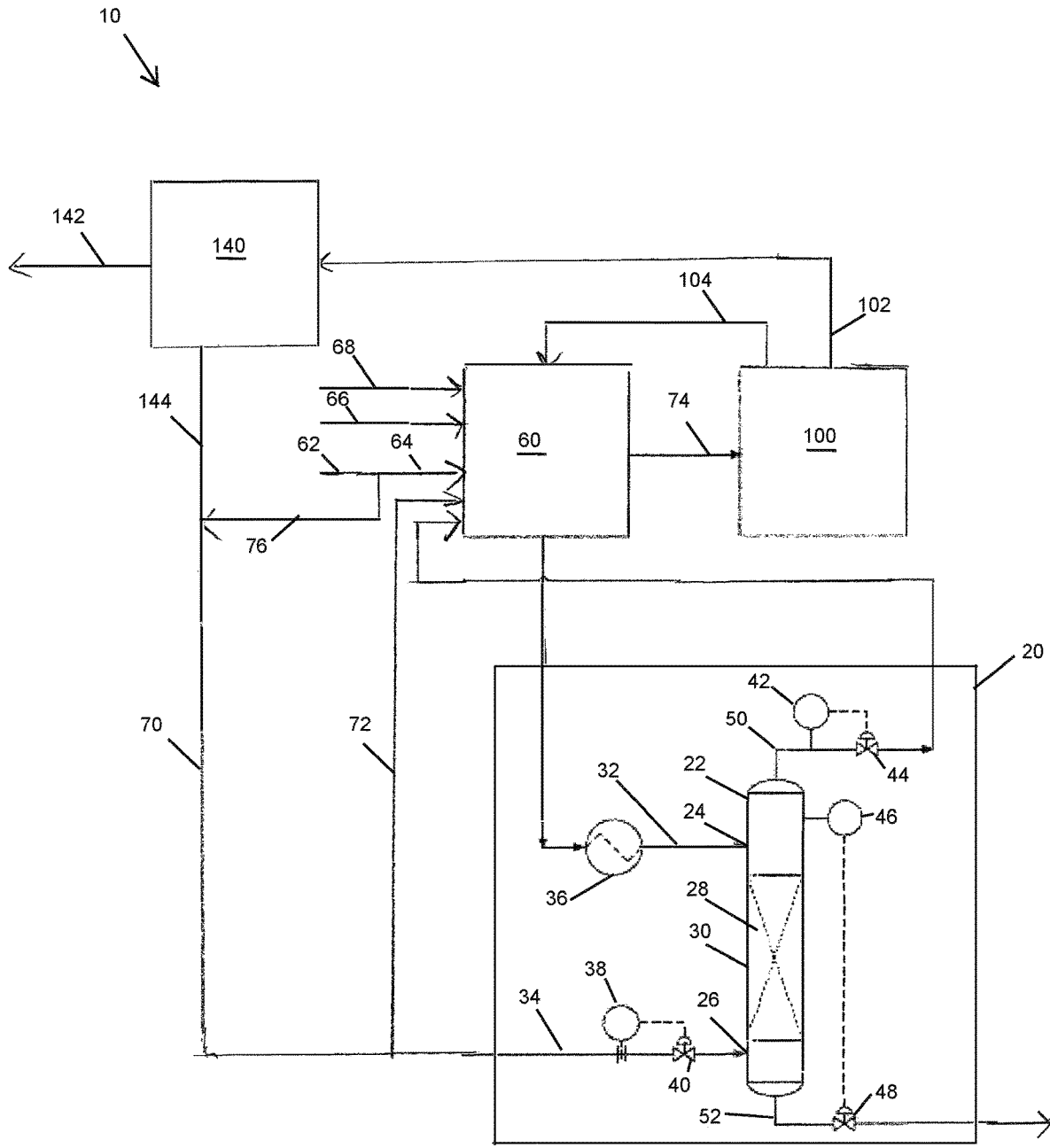

REACTOR SYSTEM AND METHOD THEREOF FOR DEGASSING SULFUR

TECHNICAL FIELD

The present disclosure relates to a reactor system and method thereof for degassing with an oxygen-containing gas having a low nitrogen concentration.

BACKGROUND

A liquid sulfur degassing technology can remove a dissolved hydrogen sulfide and polysulfides from a recovered liquified sulfur. The polysulfides can degrade to toxic, odorous, and highly flammable hydrogen sulfide. The off-gas from the liquid sulfur degassing process is often recycled to a sulfur recovery unit (SRU) reaction furnace or a main burner as a source of combustion. The trace amount of entrained elemental sulfur in this off-gas is further recovered through tail gas treating to reduce the sulfur species emitted to the atmosphere. These gas streams typically contain mainly air including nitrogen. The nitrogen content in these gas streams may be carried over to the facilities downstream for disposal to the atmosphere.

SUMMARY

In some embodiments, a reactor system can include a reactor, including: a first inlet for a first stream including a liquid sulfur including a dissolved hydrogen sulfide, a polysulfide, or a combination thereof. A second inlet can be for a second stream, wherein the second stream can be an oxygen-containing gas with no more than about 2%, by weight, nitrogen. A packing can be in contact with a catalyst.

In some embodiments, a system for degassing liquid sulfur can include: a zone, a reactor system, and a carbon dioxide conditioning zone. The zone can be configured to receive a stream including oxygen and a stream including an acid gas to produce a stream including a liquid sulfur. The reactor system can include a first inlet for a first stream including a liquid sulfur including a dissolved hydrogen sulfide, a polysulfide, or a combination thereof, and a second inlet can be for a second stream of an oxygen-containing gas with no more than about 2%, by weight, nitrogen. The carbon dioxide conditioning zone can be configured to receive a treated tail gas stream.

In some embodiments, a method of degassing hydrogen sulfide in a liquid sulfur can be provided. The method can include: providing through a first inlet of a reactor a first stream including the liquid sulfur including no more than about 600 ppm, by weight, hydrogen sulfide; and providing through a second inlet of the reactor a second stream of oxygen-containing gas with no more than about 2%, by weight, nitrogen.

These and other features will be more clearly understood from the following detailed description taken in conjunction with the accompanying drawings and claims.

BRIEF DESCRIPTION OF THE DRAWINGS

The following FIGURES illustrate embodiments of the subject matter disclosed herein. The claimed subject matter may be understood by reference to the following description taken in conjunction with the accompanying figures, in which:

FIG. 1 illustrates a system, an apparatus, and a method or process for liquid sulfur degassing and carbon dioxide capture.

DESCRIPTION

It should be understood at the outset that although an illustrative implementation of one or more embodiments are provided below, the disclosed process and apparatus may be implemented using any number of techniques, whether currently known or in existence. The disclosure should in no way be limited to the illustrative implementations, drawings, and techniques illustrated hereinbelow, including the exemplary designs and implementations illustrated and described herein, but may be modified within the scope of the appended claims along with their full scope of equivalents. Thus, while multiple embodiments are disclosed, still other embodiments will become apparent to those skilled in the art from the following detailed description. As will be apparent, some embodiments, as disclosed herein, are capable of modifications in various aspects without departing from the spirit and scope of the claims as presented herein. Accordingly, the detailed description hereinbelow is to be regarded as illustrative in nature and not restrictive.

The recitation of ranges of values herein is merely intended to serve as a shorthand method of referring individually to each separate value falling within the range. Unless otherwise indicated herein, each individual value is incorporated into the specification as if it were individually recited herein. All processes described herein can be performed in any suitable order unless otherwise indicated herein or otherwise clearly contradicted by context. The use of any and all examples, or exemplary language (e.g., "such as") provided with respect to certain embodiments herein is intended merely to better illuminate the disclosure and does not pose a limitation on the scope of the disclosed subject matter otherwise claimed. No language in the specification should be construed as indicating any non-claimed element essential to the practice of the disclosed subject matter.

Groupings of alternative elements or embodiments disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified.

The following discussion provides many exemplary embodiments of the disclosed subject matter. Although each embodiment may represent a single combination of disclosed elements, the disclosed subject matter is considered to include all possible combinations of the disclosed elements. Thus, if one embodiment comprises elements A, B, and C, and a second embodiment comprises elements B and D, then the disclosed subject matter is also considered to include other remaining combinations of A, B, C, or D, even if not explicitly disclosed.

While the following terms are believed to be well understood by one of ordinary skill in the art, the following definitions are set forth to facilitate explanation of the presently disclosed subject matter. Unless defined otherwise, all technical and scientific terms used herein have the same meaning as commonly understood to one of ordinary skill in the art to which the presently disclosed subject matter belongs.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, the terms "comprise," "comprises," "comprising," or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures preceded by "comprises [ . . . ] a" does not, without more constraints, preclude the existence of other devices or other sub-systems or other elements or other structures or additional devices or additional sub-systems or additional elements or additional structures.

Reference throughout this specification to "one embodiment," "an embodiment," or similar language means that a particular feature, structure, or characteristic described in connection with the embodiment is included in at least one embodiment of the present disclosure. Thus, appearances of the phrase "in one embodiment," "in an embodiment," and similar language throughout this detailed description may, but do not necessarily, all refer to the same embodiment.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "essentially no" can refer to a stream having no more than about 10 parts per million, by weight, (ppmw) of a substance, no more than about 1 ppmw of a substance, or even no detectable amounts of a substance, such as nitrogen.

As used herein, the term "acid gas" can refer to a gas including one or more sulfur-containing compounds and carbon dioxide.

As used herein, the term "sulfur-containing compound" can refer to a chemical compound that has at least one sulfur atom.

As used herein, the term "downstream" can refer to at least a portion of material flowing to the subject may operatively flow from the object with which it communicates.

As used herein, "upstream communication" can refer to at least a portion of the material flowing from the subject may operatively flow to the object with which it communicates.

As used here, the term "structured packing" refers to a static physical arrangement of structures or features that facilitates or enhances liquid to gas contact during countercurrent flow and/or concurrent flow.

As used herein, the term "and/or" can mean one, some, or all elements depicted in a list. As an example, "A and/or B" can mean A, B, or a combination of A and B.

In gas plants, due to the high carbon dioxide ($CO_2$) content in the feed gas for sulfur recovery, the treated tail gas often contains mainly $CO_2$, hydrogen ($H_2$), nitrogen ($N_2$) that comes mostly from combustion air and the recycled degassing off-gas, some water ($H_2O$) vapor and ppmv levels of hydrogen sulfide ($H_2S$).

In some instances, the compositions of this tail gas stream may allow cost-effective $CO_2$ recovery. However, conventional gas plants often use nitrogen either in air for combustion, instrumentation purges or sulfur pit sweeps that can accumulate in the system and generally the nitrogen must be removed or separated from $CO_2$ via carbon dioxide recovery technologies.

In some embodiments, a reactor system for degassing sulfur is in communication with a downstream sulfur recovery zone and a carbon dioxide conditioning zone for oxidizing an off-gas from the reactor system. The tail gas from the sulfur recovery zone can be treated and sent to the carbon dioxide conditioning zone to capture carbon dioxide from the treated tail gas. At least a part of the captured carbon dioxide can replace nitrogen as an inert gas for purging and/or degassing the liquid sulfur in the reactor system and to serve as a purge gas for instruments and analyzers, such as a sulfur recovery zone, but may be used throughout the system to, e.g., replace nitrogen.

Referring to FIG. 1, a system, an apparatus, or a process or method 10 (hereinafter "system 10") is depicted. The system 10 can include a reactor system 20, a zone 60, such as a sulfur recovery zone (SRZ) 60, a tail gas treating zone (TGTZ) 100, and a carbon dioxide conditioning zone (CDCZ) 140. Although a SRZ 60 is depicted, the zone 60 could be a zone receiving liquid sulfur. The reactor system 20 can include a reactor 22 having a first inlet 24, a second inlet 26, and a packing 28 (e.g., a structured packing, unstructured packing, trays, etc.). In some aspects, the reactor 22 can serve as a degassing contactor. The reactor 22 can be made of any suitable material (for example, carbon steel or other materials inert to oxidizing gases, liquid sulfur, and/or moist hydrogen sulfide gas). The reactor 22 can be operated under any suitable conditions and may be operated under pressure to increase oxygen partial pressure. In some embodiments, the reactor 22 may be operated at a pressure range of about 25 pounds per square inch absolute (psia) (170 kilopascal (kPa)) to about 135 psia (930 kPa) or a range of about 55 psia (380 kPa) to about 135 psia (930 kPa). The operating pressure range may be established based upon the concentration of oxygen in a second stream 34 of an oxygen-containing gas. For example, a low range of operating pressure may be used with high concentrations of oxygen in the second stream 34. A high range of operating pressure may be used with low concentrations of oxygen in the second stream 34.

The first inlet 24 can be configured for a first stream 32 including liquid sulfur comprising at least one a polysulfide, a dissolved hydrogen sulfide, or a combination thereof. The first stream 32 may be pumped into the reactor 22 from any suitable source of liquid sulfur. For example, the first stream 32 may be from a pit used to accumulate liquid sulfur from a Claus sulfur recovery plant. In some aspects, the liquid sulfur is from the SRZ 60. The first stream 32 may be heated or cooled to a temperature range from about 250° F. (120° C.) to about 295° F. (150° C.), or a range of about 265° F. (130° C.) to about 285° F. (140° C.) prior to being pumped into the reactor 22. In some embodiments, a cooler 36 is provided as described below. The range may be established to avoid a sharp increase in viscosity (for example, maintaining a temperature above about 305° F. (150° C.)). In some aspects, the first stream 32 can have no more than about 600 ppmw, 400 ppmw, or 350 ppmw, hydrogen sulfide, or about 300-about 350 ppmw, hydrogen sulfide.

The second inlet 26 can be configured for a second stream 34 including an oxygen-containing gas. The second stream 34 may have a relatively low concentration of nitrogen. For example, the second stream 34 may have no more than about 5 percent by weight (wt. %), no more than about 4 wt. %, no more than about 3 wt. %, or no more than about 2 wt. %, nitrogen. The second stream 34 can be oxygen mixed with any suitable inert gas, for example carbon dioxide, other than nitrogen. In some embodiments, the second stream 34 can be heated from about 150° F. (66° C.) to about 200° F. (93° C.) prior to being introduced into the reactor 22. The second stream 34 may be provided by any suitable source of oxygen-containing gas. For example, the second stream 34 may be compressed using a blower or any other suitable device and provided to second inlet 26. The second stream 34 may include oxygen of no more than about 28% by volume, or about 21% by volume to about 28% by volume. The range may be established to avoid issues with oxygen-safe cleanliness of the reactor and/or transfer lines for oxygen service. The range of partial pressure of oxygen in the second stream may vary from a range of no more than about 40 psia (280 kPa) or a range of about 5 psia (35 kPa) to about 30 psia (210 kPa).

The flow rate of the second stream 34 at the second inlet 26 may be established based upon the flow rate of the first stream 32, concentration of oxygen in the second stream 34, and/or operating pressure in the reactor 22. While any suitable molar ratio of first stream 32 to second stream 34 can be employed, typically the mole ratio will range from about 10:1 to about 60:1, preferably from about 20:1 to about 50:1. Normally the liquid sulfur can be introduced into the reactor 22 at a location at or above the location where the oxygen-containing stream 34 is introduced. In some aspects, the second stream 34 can include oxygen and an inert gas, such as carbon dioxide, and can include no more than about 2%, 1.5%, 1%, 0.9%, 0.8%, 0.7%, 0.6%, 0.4%, 0.3%, 0.2%, 0.1%, or 0.01%, by weight, nitrogen, or can include essentially no nitrogen. An inert gas can include commonly referred inert gases such as one or more of gaseous elements helium, neon, argon, krypton, xenon, or radon. In some embodiments, an inert gas can also include carbon dioxide, although carbon dioxide may be chemically reactive when exposed to moisture or high heat. In some embodiments, streams 34 and/or 72 may include water vapor. An inert gas can include at least one of carbon dioxide, argon, and helium, or an inert gas can include carbon dioxide. What is more, in some embodiments an inert gas can include SRU tail gas from any suitable Claus sulfur converter effluent.

In some embodiments, the packing 28 can be positioned between the first inlet 24 and the second inlet 26. The packing 28 may further include a material such as corrugated sheeting and/or a structured packing coated with and securing the catalyst. The catalyst can be selected from the group consisting of a bauxite, a titania, an alumina, a mixture of a silica with a thermally stable alumina, a mixture of a silica and a titania, and combinations thereof. Moreover, the catalyst can be promoted with an iron oxide or an alkaline metal oxide. Positioning the catalyst in the structured packing 28 for contacting the first stream 32 and the second stream 34 can permit the combined polysulfides and hydrogen sulfide levels to be lower (for example, less than about 5 ppmw, or less than 1 ppmw). The side walls 30 can be in contact with the catalyst.

The flow of the first stream 32 through the first inlet 24 can be controlled to provide a preselected residence time in the reactor 22, to achieve a desired level of polysulfides conversion to hydrogen sulfide from the first stream 32, and to achieve a desired level of hydrogen sulfide gas removal from the first stream 32.

The reactor system 20 can further include the cooler 36 for cooling the first stream 32 prior to entering the first inlet 24 and a control system. In some embodiments, the reactor system can include a reactor as disclosed in, e.g., U.S. Pat.

No. 11,097,952, which is incorporated herein by reference in its entirety for all purposes. The control system can include a first flow or pressure controller 38, a second pressure controller 42, and a level controller 46, and control valves 40, 44, and 48. The first flow or pressure controller 38 can control the flow of the second stream 34 into the reactor 22 via the control valve 40 and the second pressure controller 42 can control the flow of an off-gas stream 50 from the reactor 22 via the control valve 44 to the SRZ 60. The level controller 46 can control the level of fluids in the reactor 22 to maintain the structured packing 28 submerged by regulating the flow a sulfur product 52 having less than about 10 ppmw, or less than ppmw, or less than 1 ppmw hydrogen sulfide using the control valve 48.

The SRZ 60 can receive the off-gas 50 as well as a stream 64 including oxygen for oxygenating the off-gas 50 originating as a stream 62 split into the stream 64 and a stream 76. The oxygen stream 64 can include at least 90 volume percent (vol %) oxygen (e.g., 90, 91, 92, 93, 94, 96, 97, 98, 98.1, 98.2, 98.3, 98.4, 98.5, 98.6, 98.7, 98.8, 98.9, 99, 99.1, 99.2, 99.3, 99.4, 99.5, 99.6, 99.7, 99.8, 99.9, or 100 vol % oxygen) to the SRZ 60. The oxygen source stream 62 to the system 10 can obtain oxygen at a desired purity from an oxygen storage tank, or via a process known in the art, for example, the separation of air into nitrogen and oxygen, such as pressure swing adsorption (PSA), vacuum swing adsorption (VSA), or cryogenic separation techniques. In addition, the SRZ 60 can receive a stream 66 including an acid gas, an amine acid gas stream 68, and at least a portion 72 of a combined stream 70, as hereinafter described. The SRZ 60 generally operates with a thermal stage, including, e.g., at least one reaction furnace, and a catalytic stage, including, e.g., at least one Claus reactor, to convert the component gases (e.g., sulfur dioxide ($SO_2$) and $H_2S$) received from the acid gas stream 66 to elemental sulfur (in gaseous phase) and water. The Claus reaction mixture can be cooled in heat exchangers so that liquid elemental sulfur is recovered in the sulfur product stream 32 while other components remain in gas phase and are collected in the tail gas stream 74. In some embodiments, the SRZ 60 can be a sulfur recovery unit, as disclosed in U.S. Pat. No. 11,097, 952. In some embodiments, the tail gas stream 74 predominantly includes $H_2$, $H_2S$, $SO_2$, $H_2O$, $CO_2$, and small amounts of other sulfur-containing species (e.g., sulfur (S), carbon disulfide ($CS_2$), carbonyl sulfide (COS)). In particular embodiments, the tail gas stream 74 contains less than about 2, 1.5, 1, 0.9, 0.8, 0.7, 0.6, 0.5, 0.4, 0.3, 0.2, 0.1, or 0.01 vol % nitrogen-containing compounds. In some embodiments, the tail gas stream 74 includes essentially no nitrogen-containing compounds and can be used as an inert gas comprised in, e.g., the second stream 34. The SRZ 60 can produce the first stream 32 having a liquid sulfur provided to the reactor system 20, as described above, and an untreated tail gas stream 74 can be provided to the TGTZ 100.

The TGTZ 100 can be configured to convert sulfur-containing compounds received from the tail gas stream 74 to 1425, and most of the $H_2S$ that is received from the tail gas stream 74 along with the 1425 that is generated in the TGTZ 100 is absorbed in an absorber of the TGTZ 100 to produce a treated tail gas stream 102. In some embodiments, the TGTZ 100 can include a hydrogenation reactor, an absorber, and a regenerator, as disclosed in, e.g., U.S. Pat. No. 11,097,952. The TGTZ 100 can recycle a portion of the tail gas as a stream 104 to the SRZ 60. The TGTZ 100 can provide a treated tail gas stream 102 to the CDCZ 140. In some embodiments, the treated tail gas stream 102 can include about 98%-about 99%, by weight, $CO_2$, $H_2$, and water.

The CDCZ 140 can receive the treated tail gas stream 102. The CDCZ 140 can capture carbon dioxide from the treated tail gas stream 102 and provide a $CO_2$ product 142. The $CO_2$ product 142 can have greater than about 95, 96, 97, 98, 99, 99.1, 99.2, 99.3, 99.4, 99.5, 99.6, 99.7, 99.8, 99.9, 99.99, 99.999 volume percent (vol %) carbon dioxide. The CDCZ 140 can include one or more of an oxidation reactor, a heat exchanger, a blower or compressor, a dehydration unit, and an optional second blower or compressor. The CDCZ 140 can include a carbon dioxide recovery unit. The CDCZ 140 can also provide a stream 144 that can be combined with another stream 76 comprising oxygen from the SRZ 60 to provide a combined stream 70 which at least a part forms the stream 34 to the reactor system 20. The at least a portion 72 of the combined stream 70 can be separated and be provided to the SRZ 60 as a purge stream for instruments, nozzles, analyzers, and/or at least one of a sulfur storage, a pit, a storage device, or a vessel sweep medium, and/or for combustion for heaters and/or furnaces. The purge stream may or may not contain some of the oxygen containing stream 76, and can consist, e.g., the stream 144. This purge stream including carbon dioxide can be used instead of nitrogen or air to minimize nitrogen in the system 10. This elimination of nitrogen minimizes the amount of nitrogen removal in the CDCZ 140. What is more, although the at least a portion 72 is depicted as being provided to the SRZ 60, in some embodiments, the at least a portion 72 can be provided to the reactor system 20, TGTZ 100, and/or CDCZ 140 for instruments, analyzers, furnaces, a sweep medium for at least one of a sulfur storage a pit, or a vessel sweep medium, and/or heaters, as well.

In some aspects, one-hundred percent (100%) or close to 100% oxygen enrichment can be implemented in the SRZ and/or TGTZ operations. As $N_2$ is essentially removed from the TGTZ tail gas, minimization of the $N_2$ content of the treated tail gas can enable $CO_2$ recovery without requiring the use of capital cost and operating cost intensive $CO_2$ capture technology for $N_2$ separation. To further minimized $N_2$, a slip stream of compressed dry $CO_2$ or another $N_2$ free inert gas spiked with or without some oxygen can replace the compressed air medium and/or sweep medium in the system 10. Eliminating $N_2$ can allow the use of a more economical $CO_2$ recovery facility downstream. In some aspects, further reducing or eliminating the nitrogen content of the reactor system 20 off-gas by utilizing a stream from the downstream $CO_2$ compression facility or any low nitrogen content or nitrogen free inert gas or a Claus tail gas from the SRZ and/or TGTZ operation can replace air and/or nitrogen typically used in conventional sulfur degassing operations. In this case, a high purity hydrogen by-product can also be recovered from stream 102 via pressure swing absorption (PSA) technology.

In some embodiments, technical and operating solutions to existing SRZ 60 using oxygen enrichment with $CO_2$ capture of tail gas downstream. In some embodiments, $N_2$ content of the tail gas can be reduced to the $CO_2$ capture facility or almost completely eliminated. In some aspects, if small amounts of $N_2$ is present at the $CO_2$ capture facility or elsewhere in the system, the $N_2$ can be purged from the system. In some aspects, a stream from the $CO_2$ capture and/or compression facility or any low nitrogen content or nitrogen free inert gas or Claus tail gas or treated Claus tail gas can be substituted for air or nitrogen streams used in liquid sulfur degassing and/or sweep medium operations. In some embodiments, the liquid sulfur degassing can better facilitate the SRZ and/or TGTZ for $CO_2$ capture downstream by using the same $CO_2$ stream mixed with oxygen as the degassing medium. The degassing medium used in the reactor or contactor can operate at near atmospheric to high pressure (at least about 215 psia (1,500 kPa)) optionally depending on the end user requirements. In some embodiments, an existing system can be modified to replace an air or a nitrogen containing stream with a $CO_2$ capture facility slip stream or any low or nitrogen free inert stream or Claus tail gas and without changing the normal operation or control of the degassing unit. In some aspects, nearly all nitrogen sources can be eliminated to the reactor system, SRZ and/or TGTZ. The gas volume reduction associated with the nitrogen can result in less tail gas passing through the system. The gas reduction can result in the benefit of smaller equipment and thus lower capital cost. Smaller equipment can also translate to smaller plot space requirement.

In some embodiments, a system and method can be applicable to degassing liquid sulfur where the liquid sulfur can be formed and available, often this method can be implemented in the liquid sulfur produced from sulfur recovery units in refining, gas process, and chemical manufacturing facilities. In some embodiments, end users can realize significant savings in both capital investment cost and operating cost associated with the $CO_2$ capture facility employed in conjunction with oxygen enrichment of sulfur recovery units.

Having described various systems and methods herein, certain aspects and advantages of the discloses process and apparatus can include:

In a first aspect, a reactor system, comprises: a reactor, comprising: a first inlet for a first stream including a liquid sulfur comprising a dissolved hydrogen sulfide, a polysulfide, or a combination thereof; a second inlet for a second stream; the second stream, wherein the second stream is an oxygen-containing gas with no more than about 2%, by weight nitrogen; and a packing in contact with a catalyst.

A second aspect can include the reactor system of the first aspect, wherein the second stream comprises oxygen and an inert gas.

A third aspect can include the reactor system of the first or second aspect, wherein the inert gas comprises at least one of carbon dioxide, argon, and helium.

A fourth aspect can include the reactor system of any one of the first to third aspects, wherein the inert gas comprises carbon dioxide or a Claus tail gas from a Claus sulfur converter effluent.

A fifth aspect can include the reactor system of any one of the first to fourth aspects, wherein the packing is positioned between the first inlet and the second inlet.

A sixth aspect can include the reactor system of any one of the first to fifth aspects, further comprising a controller, wherein the controller is configured to control a flow of the first stream through the first inlet to provide a preselected residence time in the reactor and to achieve a desired level of hydrogen sulfide gas removal from the first stream.

A seventh aspect can include the reactor system of any one of the first to sixth aspects, wherein the packing further comprises a corrugated sheeting coated with and securing the catalyst.

An eighth aspect can include the reactor system of any one of the first to seventh aspects, wherein the catalyst is selected from the group consisting of a bauxite, a titania, an alumina, a mixture of a silica with a thermally stable alumina, a mixture of a silica and a titania, and combinations thereof.

An ninth aspect can include the reactor system of any one of the first to eighth aspects, wherein the catalyst is promoted with an iron oxide or an alkaline metal oxide.

In a tenth aspect, a system for degassing liquid sulfur, comprises: a zone configured to receive a stream comprising oxygen and a stream comprising an acid gas to produce a stream comprising a liquid sulfur; a reactor system comprising a first inlet for a first stream including a liquid sulfur comprising a dissolved hydrogen sulfide, a polysulfide, or a combination thereof, and a second inlet for a second stream of an oxygen-containing gas with no more than about 2%, by weight nitrogen; and a carbon dioxide conditioning zone configured to receive a treated tail gas stream.

An eleventh aspect can include the system of the tenth aspect, further comprising a tail gas treating zone configured to receive a tail gas stream from the zone and providing the treated tail gas stream to the carbon dioxide conditioning zone.

A twelfth aspect can include the system of the tenth or eleventh aspect, wherein the carbon dioxide conditioning zone is configured to provide a stream comprising carbon dioxide; and wherein the stream comprising carbon dioxide is combined with another stream comprising oxygen and provided as a combined stream to the reactor system.

A thirteenth aspect can include the system of any one of the tenth to twelfth aspects, wherein the zone is configured to receive at least a portion of the combined stream or the stream comprising carbon dioxide for purging instrumentation and/or nozzles.

A fourteenth aspect can include the system of any one of the tenth to thirteenth aspects, further comprising a pit, a vessel, or a storage device comprising a first stream including a liquid sulfur comprising a dissolved hydrogen sulfide, a polysulfide, or a combination thereof, and a second inlet for a second stream of an oxygen-containing gas with no more than about 2%, by weight, nitrogen.

In a fifteenth aspect, a method of degassing hydrogen sulfide in a liquid sulfur, the method comprises: providing through a first inlet of a reactor a first stream including the liquid sulfur comprising no more than about 600 ppm, by weight, hydrogen sulfide; and providing through a second inlet of the reactor a second stream of oxygen-containing gas with no more than about 2%, by weight, nitrogen.

A sixteenth aspect can include the method of the fifteenth aspect, wherein the first stream comprises no more than about 400 ppm, by weight, hydrogen sulfide.

A seventeenth aspect can include the method of the fifteenth or sixteenth aspect, wherein the second stream comprises a Claus tail gas stream.

An eighteenth aspect can include the method of any one of the fifteenth to seventeenth aspects, wherein the second stream comprises oxygen and carbon dioxide.

A nineteenth aspect can include the method of any one of the fifteenth to eighteenth aspects, wherein the second stream comprises no more than about 1%, by weight, nitrogen.

A twentieth aspect can include the method of any one of the fifteenth to nineteenth aspects, wherein the second stream comprises essentially no nitrogen.

A twenty-first aspect can include the method of any one of the fifteenth to twentieth aspects, wherein a carbon dioxide conditioning zone downstream of a sulfur recovery zone, the carbon dioxide conditioning zone provides carbon dioxide to the second inlet.

While multiple embodiments are disclosed, still other embodiments will become apparent to those skilled in the art from the following detailed description. As will be apparent, some embodiments, as disclosed herein, are capable of modifications in various aspects without departing from the spirit and scope of the claims as presented herein. Accordingly, the detailed description hereinbelow is to be regarded as illustrative in nature and not restrictive.

What is claimed is:

1. A method of degassing hydrogen sulfide in a liquid sulfur, the method comprising:

providing through a first inlet of a reactor a first stream including the liquid sulfur, wherein the first stream comprises no more than about 600 ppm, by weight, hydrogen sulfide;

providing through a second inlet of the reactor a second stream of oxygen-containing gas with about 0.0001% to about 2%, by weight, nitrogen and no more than about 28 vol. % oxygen;

generating an off-gas stream from the reactor;

passing the off-gas stream from the reactor to a sulfur recovery zone;

removing at least a portion of sulfur compounds in the off-gas stream to generate a tail gas stream;

treating the tail gas stream in a tail gas treatment zone to generate a treated tail gas stream comprising carbon dioxide and water;

purifying the carbon dioxide in the treated tail gas stream in a carbon dioxide conditioning zone to produce a stream comprising carbon dioxide; and providing carbon dioxide from the stream to the second inlet, wherein the second stream comprises a stream comprising carbon dioxide from the carbon dioxide conditioning zone and a stream comprising oxygen from the sulfur recovery zone.

2. The method of claim 1, wherein the first stream comprises no more than about 400 ppm, by weight, hydrogen sulfide.

3. The method of claim 1, wherein the second stream comprises a Claus tail gas stream from the sulfur recovery zone.

4. The method of claim 1, wherein the second stream comprises oxygen and carbon dioxide.

5. The method of claim 1, wherein the second stream comprises no more than about 1%, by weight, nitrogen.

6. The method of claim 1, wherein the second stream comprises about 0.0001% to about 0.001%, by weight, nitrogen.

* * * * *